Figure 1:
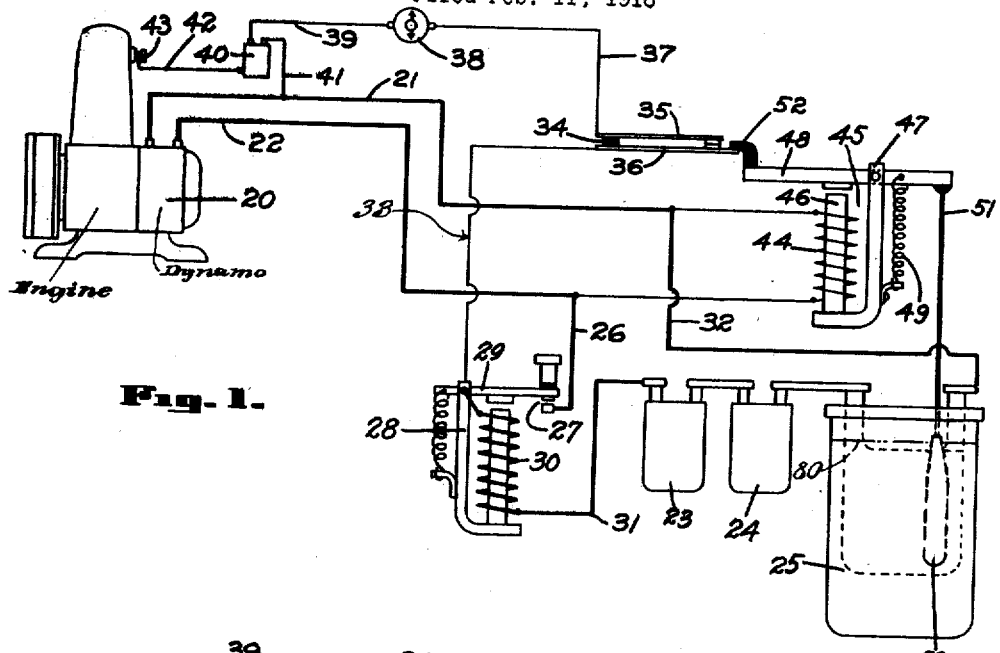

Jan. 1, 1924

C. F. KETTERING

BATTERY CHARGING SYSTEM

Filed Feb. 11, 1918

1,479,432

Witnesses

Inventor
Charles F. Kettering
By Kerr, Page, Cooper & Hayward
Attorneys.

Patented Jan. 1, 1924.

1,479,432

UNITED STATES PATENT OFFICE.

CHARLES F. KETTERING, OF DAYTON, OHIO, ASSIGNOR, BY MESNE ASSIGNMENTS, TO DELCO-LIGHT COMPANY, OF DAYTON, OHIO, A CORPORATION OF DELAWARE.

BATTERY-CHARGING SYSTEM.

Application filed February 11, 1918. Serial No. 216,466.

*To all whom it may concern:*

Be it known that I, CHARLES F. KETTERING, a citizen of the United States of America, residing at Dayton, county of Montgomery, and State of Ohio, have invented certain new and useful Improvements in Battery-Charging Systems, of which the following is a full, clear, and exact description.

This invention relates to battery charging systems comprising an engine driven generator and a storage battery charged thereby, and has for one of its objects the provision of means dependent both on the voltage of the charging circuit and on the condition of the electrolyte in the battery for causing the stopping of the engine when the battery has been charged to a certain extent.

Another object of this invention is to provide an electrolyte-controlled relay in which the normal action of the relay is modified or prevented according to the condition of the electrolyte of the storage battery.

Another object of this invention is to provide a displacement member in the electrolyte of the storage battery for controlling the relay, which is self-compensating for the increase in specific gravity of the electrolyte due to the evaporation, with the result that the lifting force exerted by the electrolyte upon the displacement member remains the same.

Other and further objects of the present invention will be apparent from the following description of embodiments thereof, reference being had to the accompanying drawings.

Figure 2:
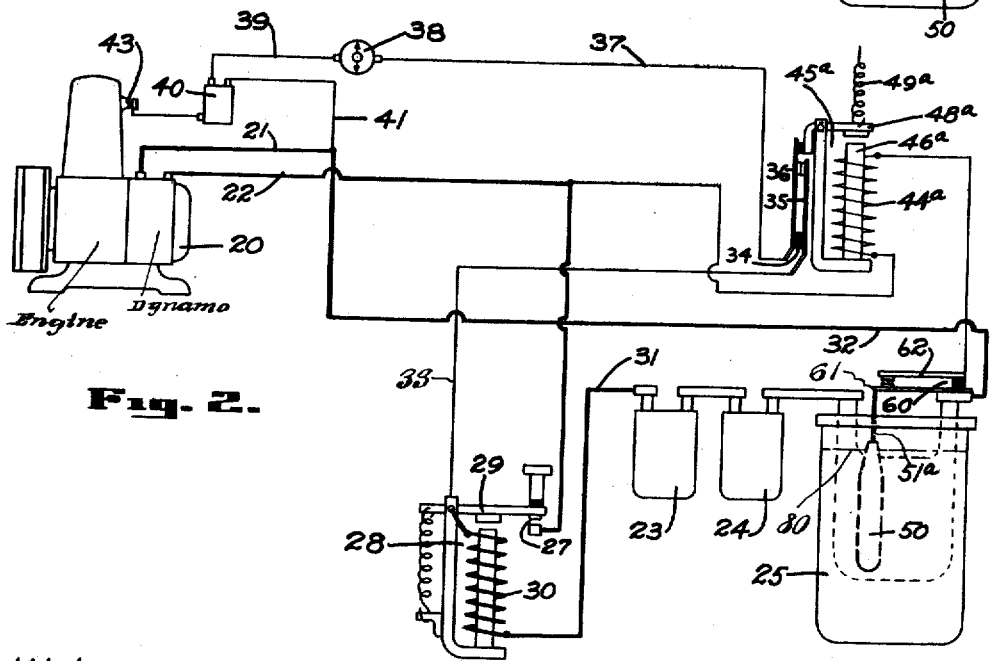

In the drawings:

Fig. 1 is a wiring diagram showing a battery charging circuit including an embodiment of the engine stopping device included in the present invention; and Fig. 2 is a wiring diagram of a battery charging system similar to that shown in Fig. 1, but including a modified form of the invention.

Referring to Fig. 1, 20 designates an engine-generator set supplying current through wires 21 and 22 for charging storage batteries 23, 24 and 25 connected therewith. The charging current passes through 22 and 26, across contacts 27 of circuit breaker 28, along armature 29, through magnet winding 30, through conductor 31, through batteries 23, 24 and 25, and through conductor 32 and 21 to the generator. The ignition circuit comprises conductor 33 connected to armature 29 of circuit breaker 28, switch contact members 35 and 36 of the ignition switch 34, conductor 37, ignition timer 38, wire 39, ignition coil 40, and wire 41 to conductor 21. The coil 40 is connected by means of wire 42 to the spark plug 43 on the engine.

The electromagnet winding 44 of cutout relay 45 is connected across the charging circuit as shown. The relay magnet core 46 is mounted on a frame 47 which supports for movement toward the core 46, the armature 48, which is normally held away from the core by means of balancing spring 49, and a displacement member 50 which is suspended in the electrolyte of the storage cell 25 by means of member 51 connected at one end of armature 48. The upper level of said electrolyte is indicated by the numeral 80. The other end of armature 48 is provided with a member 52 designed to engage contact member 36 of ignition switch 34 and to cause the opening of the ignition circuit when said armature is attracted by the magnet of relay 45.

The operation of the charging system is as follows:

By depressing armature 29 contacts 27 will close permitting current from the battery to flow through conductors 32 and 21 to generator 20 and back through conductors 22 and 26, across contact 27 through armature 29, magnet winding 30, and conductor 31. The current from the battery will cause the generator to operate as a motor and effect the starting of the engine. As soon as the engine has become self-actuating, current will flow from generator to the battery through the charging circuit already described. The circuit breaker magnet being energized by current carried through winding 30, the armature 29 will be held in attracted position and the contact 27 will remain closed. When the batteries are fully charged the voltage in the charging circuit will rise to such an extent as to energize the magnet of relay 45 sufficiently to attract armature 48, and thereby to effect breaking of the ignition circuit, thereby causing the stopping of the engine. Then the circuit breaker contacts 27 will tend to disconnect the generator from the battery.

In order to permit the operation of the engine in a case where the batteries are fully discharged and sulphated, it would be necessary to provide some means of preventing the operation of the cutout relay for the ignition circuit, for the reason that when the batteries are in the condition mentioned, the voltage of the charging circuit would rise to such an extent that the relay would operate to open the ignition circuit. This rise in voltage may be due to the state of resistance of the battery when in a fully discharged and sulphated condition. In order to overcome this difficulty I take advantage of the fact that the specific gravity of the electrolyte of the storage batteries is much lower when the batteries are discharged and sulphated. Therefore, since the lifting force exerted upon the displacement member 50 by the electrolyte of the cell 25 in the condition mentioned, has been diminished, the force due to gravity exerted by member 50 upon armature 48 will be correspondingly increased, with the result that the magnet of relay 45 will be ineffective to attract armature 48 sufficiently to cause the opening of the ignition circuit.

Fig. 2 shows diagrammatically a modified form of the invention described, in which the charging circuit and the ignition circuit are the same as in the form of the invention shown in Fig. 1. In Fig. 2, however, the voltage relay circuit across the charging circuit comprises, in addition to magnet winding 44ª, a switch 60 comprising contact members 61 and 62. Contact member 61 is designed to be movable with respect to member 62, under the influence of displacement member 50 suspended in the electrolyte of cell 25 by means of member 51ª attached to the free end of switch member 61. When carrying a current of sufficient magnitude, that is, when the number of ampere turns of magnet 44ª has been sufficiently increased, then magnet core 46ª will be energized sufficiently to cause the attraction of armature 48ª against the action of balancing spring 49ª, and thereby effect separation of contact members 35 and 36 of ignition switch 34. The operation of the modified form of the invention shown in Fig. 2 is as follows:

When the batteries are discharged and sulphated, the specific gravity of the electrolyte will be low, and the displacement member 50 relatively heavy, with the result that the switch 60 will be open. Therefore, although the voltage of the charging circuit would be sufficient to cause the attraction of the armature 48ª of relay 45ª, and the consequent opening of ignition switch 34, the said relay 45ª cannot operate since switch 60 in the relay circuit is open. Since the ignition circuit remains closed, the engine will continue to operate. During the first stages of battery charging, the resistance due to the sulphated condition of the batteries is broken down and there is a corresponding decrease in the voltage of the charging circuit. From this point on, the voltage rises gradually according to the condition of battery charge, as is well understood in the art. When the batteries have been charged to a certain degree and the specific gravity of the electrolyte has reached a certain point, the displacement member 50 will have risen to such a certain extent as to permit the closing of switch members 61 and 62. The closing of switch 60 will permit a small amount of current to flow through the relay magnet winding 44ª. As soon as the batteries have become charged the voltage of the charging circuit will rise to such a value as will cause the relay to operate and open the ignition system, and thereby cause the stopping of the engine.

From the foregoing description it will be apparent that there has been provided in both of the embodiments of my invention, means for effecting the stopping of the engine which is dependent both on the voltage of the charging circuit and on the condition of the electrolyte in the storage battery. There is a time when the battery is discharged and sulphated, and the voltage of the charging circuit is sufficient to operate a relay causing the stopping of the engine. It is the function of the displacement member to prevent the operation of the relay by virtue of the decreased buoyancy of the electrolyte. When at the other extreme of battery conditions, that is, when the batteries are fully charged, and it is desired to stop the engine, the voltage of the charging circuit is again sufficiently great to operate a voltage relay to effect the stopping of the engine. The displacement member 50 will now be inoperative to modify the function of the voltage relay, since the specific gravity of the electrolyte has risen with the result that the displacement member is buoyed up to a point where it can no longer prevent the operation of the relay.

It will be noted that the displacement member 50 is provided with a tapered upper end, and is suspended with the upper end located near the normal level 80 of the electrolyte. This taper is so proportioned that as evaporation of the electrolyte takes place, and increasing portions of the displacement member extend above the level of the electrolyte, the quantity of electrolyte displaced will be decreased in proportion to the increase in specific gravity. Thus the lifting force exerted upon the displacement member will remain constant.

While the electrolyte-controlled relay is described and shown in two modified forms as applied to a battery charging system for the purpose of stopping the engine, it is to be understood that other applications to a battery charging system could be made, resulting in modifications of the functions of the battery charging elements, other than the stopping of the engine.

While the form of mechanism herein shown and described, constitutes a preferred embodiment of one form of the invention it is to be understood that other forms might be adopted and various changes and alterations made in the shape, size, and proportion of the elements therein without departing from the spirit and scope of the invention.

What is claimed is as follows.

1. In a battery charging system, the combination with an engine driven generator and a storage battery to be charged thereby; a charging circuit connecting the battery and generator; means dependent on the voltage of the charging circuit for stopping the engine; and means dependent on the condition of the electrolyte for rendering the first named means inoperative.

2. In a battery charging system, the combination with an engine driven generator and a storage battery to be charged thereby; a charging circuit connecting the battery and generator; an ignition system for the engine; means dependent on the voltage of the charging circuit for rendering the ignition circuit inoperative; and means dependent on the condition of the electrolyte of the battery for rendering the first named means inoperative.

3. In a battery charging system, the combination with an engine driven generator and a storage battery to be charged thereby; a charging circuit connecting the battery and generator; an ignition circuit including a switch; a cutout relay connected across the charging circuit to open the ignition switch; and means dependent upon the condition of the electrolyte to render the relay inoperative.

4. In a battery charging system, the combination with an engine driven generator and a storage battery to be charged thereby; of a charging circuit connecting the battery and generator; an ignition circuit including a switch; a cutout relay including an electromagnet and armature, said magnet winding being connected across the charging circuit; and a displacement member in the electrolyte cooperating with the armature of the relay to prevent the action of the relay under certain battery conditions.

5. In a battery charging system, the combination with an engine driven generator and a storage battery to be charged thereby; of a charging circuit connecting the battery and generator; a voltage controlled device in the charging circuit to cause stopping of the engine; and a displacement member in the electrolyte to prevent the operation of said voltage controlled device.

6. In an electrolyte-controlled circuit breaker, a combination with switch members; of an armature for effecting the opening or closing of the switch members; an electromagnet for attracting the armature; and a displacement member in the electrolyte of the storage battery, connected with the armature whereby the operation of the said magnet is affected when the electrolyte is in a certain condition.

7. In an electrolyte-controlled circuit breaker, a combination with switch members; of an armature for effecting the opening or closing of the switch members; an electro-magnet for attracting the armature; and a displacement member in the electrolyte of the storage battery, connected with the armature whereby the operation of the said magnet is affected when the electrolyte is in a certain condition, said displacement member having a tapered upper end.

8. In an electrolyte-controlled circuit breaker, the combination with a storage battery containing electrolyte; of switch members; a displacement member suspended in the electrolyte of the storage battery, and operatively associated with the switch members, said displacement member having a tapered upper end located near normal level of the electrolyte, whereby the increase in specific gravity of the electrolyte and the fall of its surface level due to evaporation is compensated for by the decrease in the quantity of electrolyte displaced.

9. In a battery charging system, the combination with a current source and a storage battery adapted to be charged thereby; of a charging circuit connecting the current source and the battery; means dependent on the voltage across the battery for interrupting the charging circuit; and means dependent on the condition of the electrolyte for rendering the first named means inoperative.

10. In a battery charging system, the combination with an engine driven generator and a storage battery to be charged thereby; a charging circuit connecting the battery and generator; an ignition circuit including a switch; and means for opening the ignition switch, said means comprising a device responsive to the voltage of the battery, and a second device responsive to the condition of the battery electrolyte.

In testimony whereof I affix my signature.

CHARLES F. KETTERING.

Witnesses:
J. W. McDONALD,
IRVIN A. GREENWALD.